Oct. 5, 1965   E. E. TRAUTWEIN   3,209,893
OSCILLATING OR ROCKER FEEDER MECHANISM FOR
DISTRIBUTING MATERIALS
Filed July 5, 1962   3 Sheets-Sheet 1

INVENTOR
Elmer E. Trautwein
BY Thomas, Weisman & Russell
ATTORNEYS

Oct. 5, 1965 E. E. TRAUTWEIN 3,209,893
OSCILLATING OR ROCKER FEEDER MECHANISM FOR
DISTRIBUTING MATERIALS
Filed July 5, 1962 3 Sheets-Sheet 2

INVENTOR
Elmer E. Trautwein

BY *Thomas, Weisman & Russell*

ATTORNEYS

INVENTOR
Elmer E. Trautwein the involved material be distributed in uniform layers. This has been done conventionally by a variety of means. However, conventional methods tend to degradate the material whereas the mechanism of the instant invention accomplishes smooth and efficient transfer, as well as uniform distribution, without damage to any of the involved discrete particles.

United States Patent Office 3,209,893
Patented Oct. 5, 1965

3,209,893
OSCILLATING OR ROCKER FEEDER MECHANISM FOR DISTRIBUTING MATERIALS
Elmer E. Trautwein, Indiana, Pa., assignor to Industrial Science Corporation, Cleveland, Ohio, a corporation of Ohio
Filed July 5, 1962, Ser. No. 207,552
7 Claims. (Cl. 198—43)

This invention relates to a mechanism designed to uniformly feed and distribute granular, pelleted or other discrete particles in a uniform fashion upon a moving carrier means, such as a conveyor belt used for drying purposes. More particularly, the invention is directed to such mechanism wherein a pick up and discharge chute is so oscillated or rocked from side to side in even and uniform fashion as to distribute the conveyed materials to a conveyor means of substantially greater width or area than the chute, the distribution being such as to lay the materials upon the conveyor to a uniform depth and evenly throughout the width thereof.

In this latter respect, it is important to observe that in many industrial processes, the conveyor means takes the form of a moving belt used for drying purposes, the product being distributed upon the belt and the latter being subjected to dehydrated air or air at elevated temperature whereby moisture is removed from the materials during their course along the belt. Often it is desirable to direct the dry air from underneath and through an open mesh belt. In such practices, if the discrete particles being handled are not evenly distributed upon the belt, there is a consequent uneven application of air so that the mass of granular materials is not evenly dried throughout. This will be particularly true where the depth of material being handled varies from side to side of the drying belt; where the depth of the material is greater, there will be consequently greater resistance to air flow and the granular materials at that greater depth will not be as completely dried as those positioned upon the belt at a lesser depth. Also, if the material being handled is not evenly distributed upon such a form of dryer (i.e., where the drying medium is passed from underneath the conveyor, through open spaces therein), but unevenly placed thereon, open areas will be left, thus permitting escape of the drying medium without achieving any useful drying effect. Also, in such instances, the particles at such lesser depth will be blown about or disturbed by the jetting action of the drying medium which will occur at these open spaces, resulting in damage thereto, or destruction of the predetermined and desired shape thereof.

In many industrial processes, the materials handled are often discharged in extremely narrow streams. It then becomes necessary to distribute the same over a wide area for the purposes just mentioned—to afford a drying area of substantial dimension. A typical example is the distribution of tobacco upon a conditioning belt. Generally speaking, the incoming stream of tobacco may be some two feet wide. Yet it is normally desirable to distribute this relatively narrow stream on the surface of a conditioning belt which may have a width of the order of some twelve feet or more. Another example is the distribution of mineral or carbonaceous agglomerates to a sinter hearth where the stream of materials, having a width of some one foot must be distributed evenly over a width of six feet or more. Also, in the pelleting of various minerals, such as iron ore, the pellets, emanating from previous processing steps, are discharged in a relatively narrow stream but must be distributed, for adequate drying, upon the surface of a substantially wide grate or belt of substantial width.

Although the instant invention is primarily directed to a mechanism ideally suited to distribute wet, pelleted materials formed in a balling drum and which, as a final step of treatment, need to be subjected to an adequate drying or moisture removal procedure, the assembly is also adaptable for use in almost any industrial field where the desirability of adequate and even drying is obvious. Thus, the feeding mechanism of the invention is inclusive of the transfer feeding or distribution of any wet material which has been rolled, pressed or cut into definite shapes and wherein it is desirable and often essential to retain that identity of shape from feed end to discharge end of the feeding, distributing device.

As noted above, it is also important in such distribution operation that the involved material be distributed in uniform layers. This has been done conventionally by a variety of means. However, conventional methods tend to degradate the material whereas the mechanism of the instant invention accomplishes smooth and efficient transfer, as well as uniform distribution, without damage to any of the involved discrete particles.

The invention may be summarized as consisting of a simple segment of a funnel or chute mounted for oscillatory motion and in such manner that as the funnel is rocked or oscillated, the material, received from such pretreating devices as a balling drum, slides down the chute and is distributed first to one side of the receiving means and then to the other, the result being a widened stream of material uniformly spread throughout the surface to which it is delivered.

The apparatus to achieve this desideratum is inclusive of two eccentric drive means, one in interconnection with each side of the pivoted chute, such twin eccentric drive means being 180° out of phase with each other. In one embodiment of the invention, such eccentric drive takes the form of opposed crank wheels carrying appropriate crank pins. In another embodiment of the invention, the eccentric drive means takes the form of opposed cam wheels having appropriate cams engaged therewith. The apparatus is also inclusive of cam configurations which may cause the speed of the rocker motion to be slightly higher at the extreme sides and somewhat slower in the middle, or vice versa, as for example, such cam motion permitting more dwell when the rocker feeder reaches the respective tilted positions at each cycle of operation.

It is contemplated that the involved cams which motivate the feeder can thus be so fabricated, within the skill of the art, to provide this period of dwell at any predetermined portion of the cycle of oscillation. This will enable the operator to vary the nature of the imparted oscillatory motion within a wide range, in order to cover a multitude of different materials, and to compensate for the different inherent characteristics of different kinds of granular or pelleted compositions.

There is a further unusual and important characteristic of the combination of this invention: in one embodiment thereof, means are provided for ease of adjustment of the maximum angle of tilt to either side; this again enables the operator to adjust such angle to accommodate various materials which may exhibit different characteristics when handled from the viewpoint of obtaining the main objective of a device of this nature—even, continuous flow thereof and even distribution to some form of moisture removal means, as a constantly moving, perforated conveyor belt.

It is accordingly a primary objective of the invention to provide a material distribution device which enables receiving of such material in a narrow stream but achieves the feeding of such material, as agglomerates or pellets, to a relatively wide area in even and uniform fashion.

It is a further object of the invention to provide an assembly of the described type wherein the rocker feeder is fitted with means permitting the operator to obtain a period of dwell at any predetermined portion of the tilting cycle, so that different inherent characteristics of materials being handled can be more accurately compensated for.

Another object of the invention is to provide a rocker feeder of the type generally described in the foregoing which includes a means for ease of variation of the amount of angular tilt of the feed-in chute whereby the unit can be suitably and appropriately adjusted to compensate for various different characteristics found in different grades of material.

It is another objective of the invention to provide a rocker feeder mechanism which can efficiently handle such materials as pellet spheres at a high rate of speed. Such is necessary with regard to such preformed materials when they must be kept rolling at substantial speeds to keep them from sticking together or building up to larger sized spheres.

It is another object of the invention to provide a rocker feeder mechanism which utilizes a divergent chute or feeder which is wider from its feed end to the discharge end thereof and wherein a predetermined radius between the bottom and sides of said chute effectively prevents build-up of wet material in the corners, the divergent form of the feeder, and the apparatus for oscillation thereof in cycles of predetermined tilt, successfully and efficiently accomplishing pellet distribution across, e.g., a dryer belt which is several times the width of the chute at its outby end.

Finally, it is a fundamental objective of the invention to provide an arrangement of the above-mentioned type which represents the essence of simplicity and versatility, i.e., it can be built and installed by relatively unskilled workmen; its performance in use can also be varied substantially to accommodate different materials by allowing an ease of adjustment of tilt and by providing means which permit predetermined periods of dwell throughout any selected portion of the feeding cycle.

The invention will be described more particularly in the following, and with reference to the accompanying drawings wherein corresponding numerals represent corresponding parts of the combination, and wherein.

Figure 2:
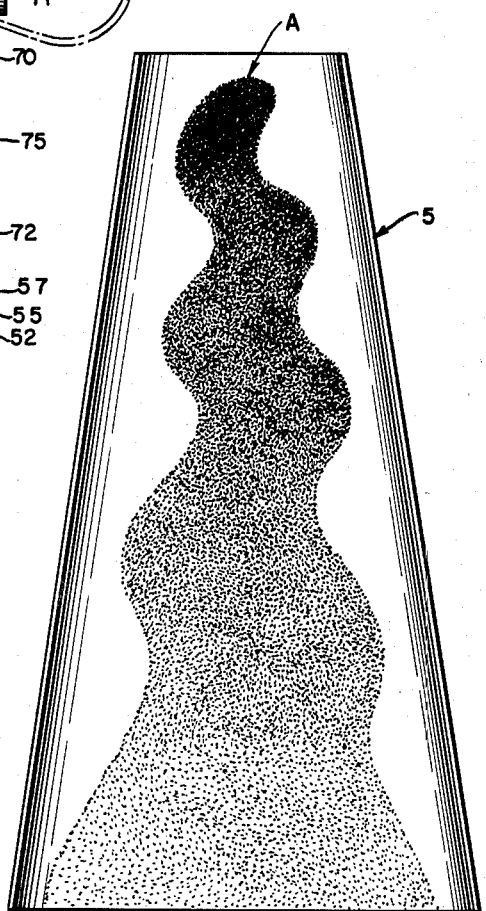
FIGURE 2 is a top plan view of the feeder chute which pictorially and graphically shows the manner by which a relatively narrow charge of material fed to one end thereof is evenly spread and distributed throughout the opposite end thereof, and prior to discharge, by means of the oscillatory motion imparted to such chute.

Referring more particularly to these various figures, it is seen that the material to be handled is first discharged to a divergent chute, generally indicated at 5. As seen in FIGURE 2, this chute is relatively narrow at its inby end, its form diverging at the opposite end to substantially greater width. In the preferred embodiment of the invention, the flat portion of the inlet end of the chute may be of a width of only one foot whereas the discharge end thereof may be of the order of about three and one-half feet, again speaking only of the flat bottom or base of the chute. Although not shown, the chute or funnel 5 may be jacketed to maintain warmth in the case of materials of high moisture content tending to adhere thereto.

Figure 3:
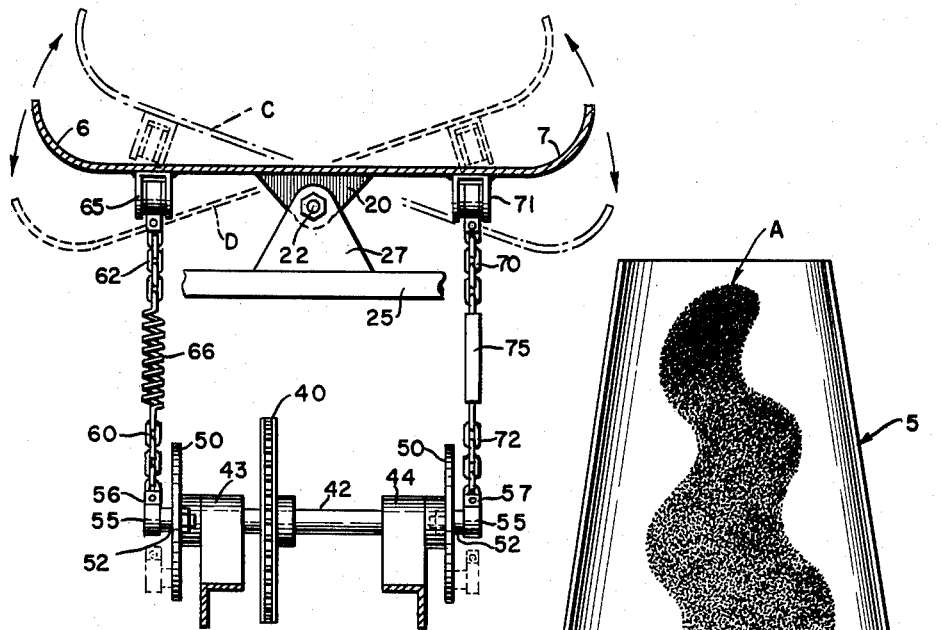
FIGURE 3 is a cross section view taken on the line 3—3 of FIGURE 1.

In any event, in order to prevent the build-up of wet material in the corners formed by the sides of the chute 5, it has been found desirable to provide a curved portion between bottom and side walls, such representing a definite radius between the bottom and such sides. This is indicated in FIGURE 3, where the curved side portions 6 and 7 each have a definite and predetermined radius which, with respect to the dimension of the example given, represents an arc or curvature drawn upon a six inch radius.

The oscillating or rocking motion imparted to this chute, by means to be described, in turn causes the material received by the chute to be gradually spread out. This is illustrated in FIGURE 2 where it is seen that the material as it is initially charged to the device, as at A, is deposited in a relatively narrow stream, as would be the case if pellets are received from a balling drum. However, at the opposite or outby end of the chute, the oscillations imparted thereto produce a spreading action upon the material, as pellets, which cause them to spread across substantially the entire three and one-half foot width of the discharge end of the chute, as indicated at B. Actually, the movement of the material approximates that of a steam pattern, the pattern moving from side to side as the chute oscillates. Furthermore, the spreading effect imparted to the pellets continues after discharge, thus further spreading the material throughout the width of the substantially wider conveyor area.

Figure 1:
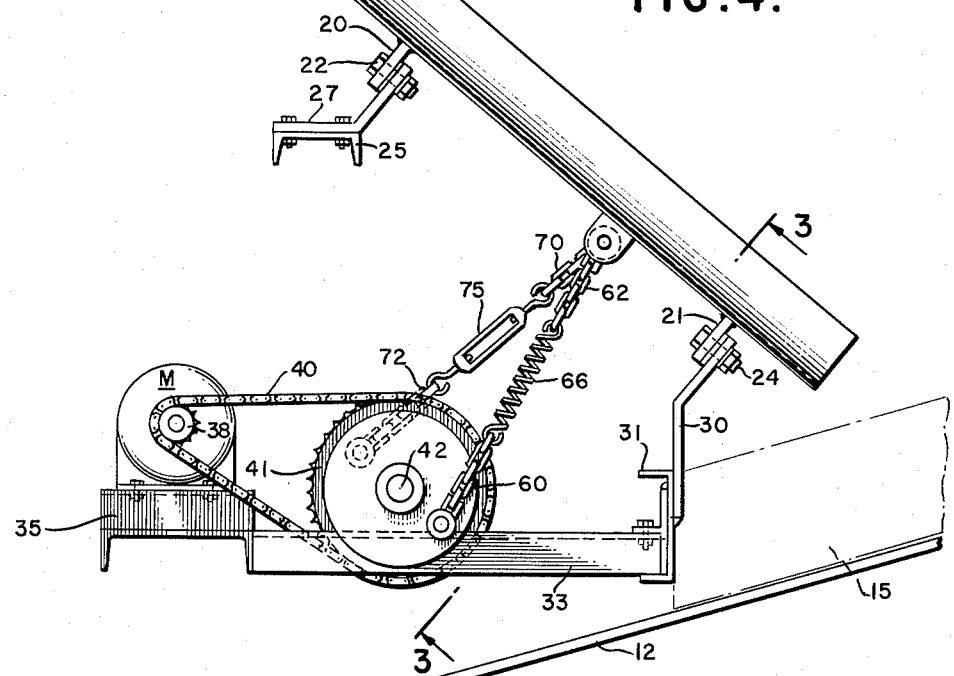
FIGURE 1 is a side elevation view illustrating the relative angular positioning of the feeder chute with respect to such means as a drying belt, to which it feeds, and evenly distributes, the involved material.

The chute 5 occupies a relative angularity as indicated in FIGURE 1 where it is disposed, in this embodiment of the invention, at an angle of about 40° to the horizontal, thus placing it in position for relatively high speed discharge of the conveyed material to a traveling conveyor belt 12. It is to be observed that this angle of inclination may be varied—for the angle at which the rocker feeder is set is a function of the angular phase of the material being distributed. At any rate, such belt 12 is preferably disposed at an opposite angularity to the horizontal, thereby carrying the materials upwardly after discharge thereupon, the preferred angularity of the conveyor in the embodiment of the invention here under consideration being about 15° to the horizontal. Such angularity is appropriate as for example, to elevate the dried material to a storage bin; but it is obvious that the belt 12, or any other type of conveying device, may be installed at any slope deemed necessary to fulfill the requirements and geometry of different plant arrangements. The conveyor belt is driven by opposed rollers or drum supports as indicated by drum 13 of this figure. Two skirt boards 15 are positioned vertically above each side of the conveyor belt 12 and spaced apart a distance, in this version of the invention, of about five and one-half feet, that area representing the area to which the material from the chute 5 is discharged.

As stated in the foregoing, the chute 5 is mounted for oscillatory or rocker motion and, to this end, two centered lugs 20 and 21 are welded or otherwise suitably secured underneath the chute and at spaced positions representing the center line thereof. These lugs are apertured to receive pivot pins 22 and 24 and the latter suitably secured in stationary supports affixed to the main frame of the unit, as represented by brackets 27 and 30, respectively. Bracket 27 is bolted to a main frame member 25, with the support 30 representing a similar type of bracket welded to a main frame member 31. A cross frame piece 33 in turn affords support for a motor mount 35 upon which a motor M is positioned to drive the reciprocating means, to be described. Such motor is preferably of a variable speed type so that, if different cam formations are used as herein described, speed of the motor can be reduced or increased to compensate for such different arrangements, or speed can be varied in any event with any given cam or drive means to accommodate predetermined rapidity of oscillation of the trough 5 as required with respect to different types of materials.

The motor M is adapted, through drive pinion 38, to drive a suitable drive chain 40, meshed with drive sprocket 41. The latter is keyed to a stub shaft 42 journaled in appropriate bearings 43 and 44 which are in turn affixed, as indicated, to appropriate frame members of the over-all mounting means. The stub shaft 42 has keyed to it, at each end, identical crank wheels 50 each of which is appropriately apertured, at a predetermined distance from the center axis thereof, to receive crank pins 52. As indicated in FIGURES 1 and 3, the crank wheels are so positioned as to dispose the crank pins 180° out of phase with each other so that, if one is in its uppermost position, its counterpart upon the other side of the unit is in its lowermost position. The two crank pins thus cooperate to oscillate the trough 5 that amount represented by the amount of offset of said respective crank pins.

Each crank pin is associated with interconnecting mechanism adapted to reflect its eccentric motion. Thus, and again viewing FIGURE 3, the crank pin 52 upon the left is interconnected by means of a suitable collar 56 with a chain 60 and an upper chain 62. Intermediate these chains is positioned a helical spring 66, for purposes which will be mentioned, such spring being provided with end hooks 63 to engage each of the described chains. The upper chain 62 is pivoted to bracket 65 which is welded or otherwise secured to the bottom of the chute 5.

Similarly, the opposed crank pin 52 upon the right of the mechanism as it is viewed in FIGURE 3, likewise through an appropriate collar 57, is interconnected with an intermediate chain 72 to an intermediate turnbuckle 75. This turnbuckle through appropriate end hooks 73 also interconnects with an upper chain element 70 which, as in the former case, is pivoted to a corresponding bracket or lug 71, also welded to the bottom of the trough 5. Brackets 65 and 71 are spaced an equal distance from the pivot point of oscillation of the trough as represented by pivot pin 22.

From the foregoing, it will be observed that one side of the oscillatory drive is provided with a tension spring (66) exerting tension upon that side of the drive, or constantly exerting bias or downward pull upon that side; whereas the other side of the oscillatory arrangement is provided with a turnbuckle (75) permitting ease of adjustment of tilt. For example, if in the relative position shown in FIGURE 3, the trough is not exactly aligned laterally (i.e., in a position of no tilt), then it can be so aligned by the operator simply by movement of the turnbuckle in the desired direction to obtain the alignment, this maneuver lessening or increasing the amount of tension upon tension spring 66 in that amount to achieve this objective. Also, this turnbuckle and tension spring arrangement can be thusly adjusted to correct the distribution of the materials charged to the tray or trough 5 (as from a balling drum which may cause uneven feed at the input) by a slight increase of tilt to one side or the other.

The arrangement of the embodiment of the invention just described assures not only this accuracy of adjustment, but also maintains the chute under a condition of constant stress in the sense that the positive linkage on each side of the chute eliminates any chattering during motion thereof and permits oscillation at relatively high rates of speed, as is often necessary when the charge to the trough is of substantial bulk and, in part because of the angularity of the position of the chute, the movement thereof is at relatively high speed.

The operation of the mechanism just described will be further appreciated from the dotted line showing found in FIGURE 3. The trough is in an intermediate position of no tilt as it is depicted in solid line. In this position, each crank pin is in a plane parallel to the horizontal; however, upon movement of the crank pin 52 upon the right side of the unit downwardly, and corresponding movement of the opposed crank pin upwardly, a maximum degree of tilt will be obtained as represented by the dotted line position indicated at C. Correspondingly, upon a further 180° rotation of the respective crank and pins, the positions thereof are exactly reversed, with the result that the chute is now tilted a corresponding amount in the opposite direction, as represented by the dotted line showing marked D in this figure. Under operating conditions, the consequence of this comparatively rapid, oscillatory movement, is to effectively spread the charge of material from a bunched or narrow formation at point of entry to an even spread-out layer at point of discharge, and as indicated in FIGURE 2.

Figure 4:
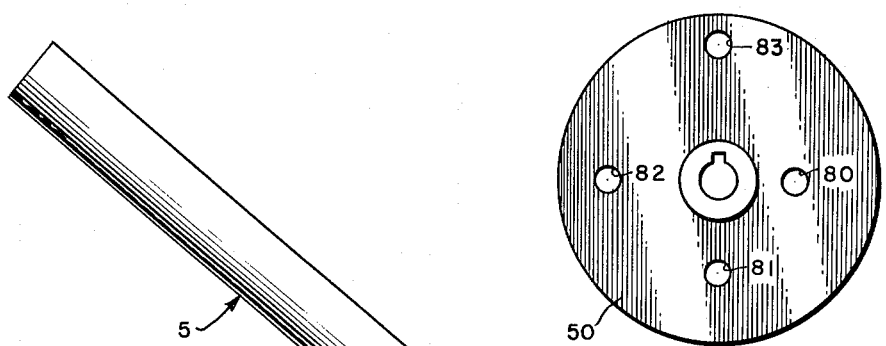
FIGURE 4 is a detail view of one form of cam means suitable for use in the assembly achieving oscillation wherein various positions are made available to optionally vary the amount of angular or lateral tilt of the chute from side to side.

The crank wheels 50 as described in the foregoing may take the form more particularly illustrated in FIGURE 4. As shown in FIGURE 3, the crank pins are located at maximum radius, or maximum distance, from the axis of rotation, this in turn creating a maximum of tilt or oscillatory motion in the chute 5. However, it is to be understood that such crank wheels 50 can be so made as to afford the operator the opportunity of varying the crank pin radius, with consequent variation or resultant reduction in the over-all amount of angular tilt. For example, in FIGURE 4 the crank wheel 50 is shown as having four different and alternate positions for the mounting of crank pin 52, these positions being represented by apertures 80, 81, 82 and 83, respectively. It is obvious that the position at 80 would create the minimum of amplitude or rocker motion, the point 83 the maximum, and those intermediate correspondingly graduated. Hence, simply by changing the position of the respective crank pins 52, the amount of oscillatory motion, as stated, can be changed, it being understood that in any event the crank pins on each side of the unit are always positioned exactly out of phase with respect to each other.

In the foregoing, mention has been made of providing an arrangement wherein a predetermined period of dwell can be provided. As substitutes for the crank wheels 55, and as shown in FIGURE 3, adjustable stroke eccentrics or cams may be used which produce a "dwell" period at any desired point in the tilt cycle. Thus, it may be desirable to have a cam motion with more dwell when the rocker feeder reaches its respective maximum tilted positions, meaning that the oscillating motion is decelerated at such positions. This may be appropriate as to certain materials in the interests of more even distribution thereof.

Figure 5:
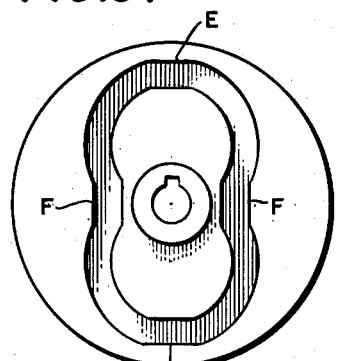
FIGURE 5 is a detail view of an alternate type of cam which enables a period of dwell in the oscillation cycle to be obtained at the maximum tilt position of the unit.
Figure 6:
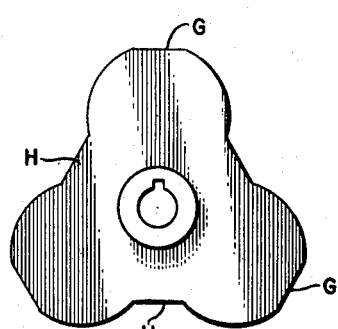
FIGURE 6 is another and alternate type of cam useful in the assembly wherein a triangular formation is employed and wherein a period of dwell is provided at the maximum angle of tilt during each oscillation cycle.

In order to achieve this objective of greater dwell, or slower motion at one particular point in the cycle of oscillation, a cam or cams in the nature of those illustrated in FIGURES 5 and 6 are utilized.

In the cam of FIGURE 5, the crank wheel 85 is provided with a cam groove 87 upon its inner face. In the version of the cam here shown, this cam groove is elongated, and provided with flattened portions resulting in dwell, or slower motion at the position of extreme tilt. Hence, the cam groove at positions E is flattened so that there is no acceleration of motion at this point but to the contrary, a period of rest or "dwell" when the cam roller engages such flattened portions E. Since, as in the former case, two cam wheels are utilized and since they are out of phase with each other in the same amount as before (180°), each cam groove must be provided with additional flattened portions F. Thus, when the cam roller on one side of the unit engages flattened portions E, the cam roller upon the other side engages the corresponding flattened portions F. The result is that at the height of tilt on one side, there is a period of dwell; a corresponding period of dwell is provided when the angle of tilt is at its maximum on the other side of the unit.

Figure 7:
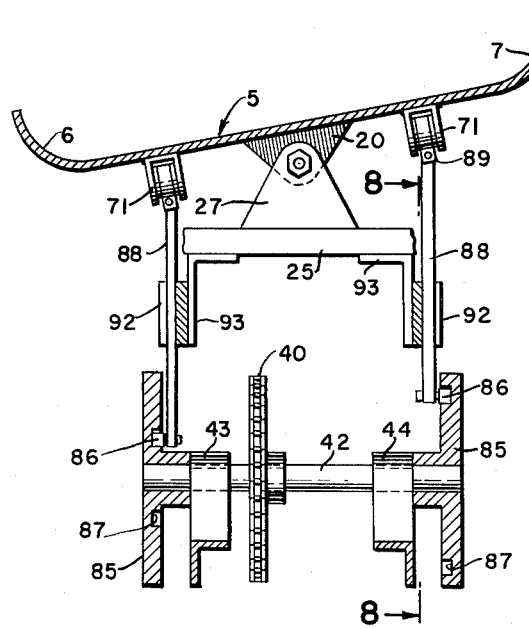
FIGURE 7 is a view similar to FIGURE 3 but illustrating the use of a cam means of the type shown in FIGURE 5.
Figure 8:
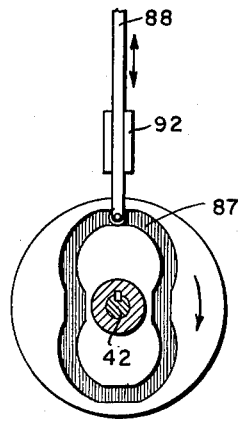
FIGURE 8 is a section view taken on the line 8—8 of FIGURE 7.

The assembly used when a cam of the nature of cam 85 is employed is shown in more detail in FIGURES 7 and 8. Here it is seen that each cam 85 is keyed to shaft 42 with the respective cam grooves facing each other. A contacting roller 86 in each cam groove is responsive to the motion of the cam wheels 85. The cam rollers 86 are suitably mounted upon push rods 88 which are in turn connected to the two brackets 65 and 71 by pivotal connections 87 as seen in FIGURE 7. It is necessary that the cam rollers be maintained in the position shown or constantly be caused to ride within these same grooves 87 and to this end sleeves or bushings 92, mounted upon suitable brackets 93 which are in turn secured to frame member 25, provide the bearing surface for the push rods 88 as they reciprocate responsive to rotation of the two cam wheels 85. Oscillation of the trough or chute 5 is thus assured. The degree of oscillation is, of course, dependent upon the particular shape of cam grooves 87, which may be varied to suit conditions.

The flattened portions in such grooves, for the purpose of obtaining a dwell period, are also shown in FIGURES 7 and 8, it being understood that these may be provided as they are shown in FIGURE 5, where such periods of dwell during the oscillatory cycle are desired.

An alternate version of an appropriate type of cam to be used in place of cam 85 is shown in FIGURE 6. This comprises a triangular shaped cam 90 having alternate raised portions and depressions. A period of dwell at the maximum point of tilt is provided by flattened portions G. The cam wheel 90 upon the opposite side of the assembly matches such flattened portions G by the flattened areas H. Again, each of the cams 90 is mounted 180° out of phase so that, when one cam is at a position of maximum tilt as at G, the opposite cam is at a position of minimum tilt as at H. As stated, at these positions there is a period of dwell represented by the flattened portions G and H.

Figure 9:
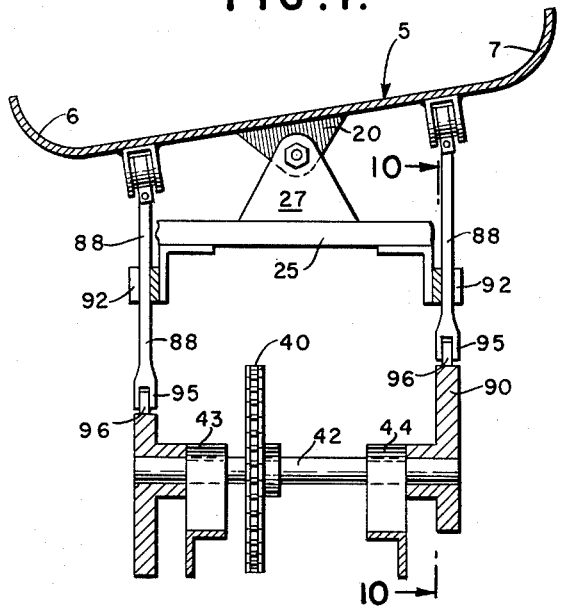
FIGURE 9 is a view similar to the view shown in FIGURES 3 and 7 but illustrating the use of the cam means as shown in FIGURE 6.
Figure 10:
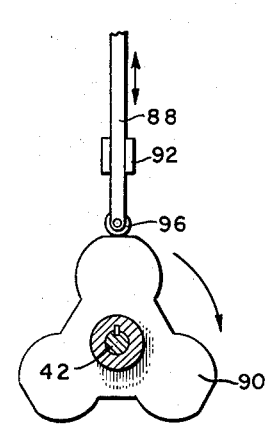
FIGURE 10 is a section view taken on the line 10—10 of FIGURE 9.

The arrangement utilizing the cam wheel 90 is similar to that of the assembly wherein use is made of the cam wheel 85, and is more particularly shown in FIGURES 9 and 10.

It will be again noted that cam wheels 90, keyed to the same stub shaft 42, and as per FIGURE 9, are shown exactly out of phase. Here the cam rollers 96 ride upon the peripheral surface of the triangular shaped cam wheels 90, these rollers being suitably mounted in the forked portions or yokes 95 of push rods 88. The latter, as in the case of the assembly of FIGURE 7, are maintained in position by sleeves 92.

In FIGURES 7 and 8, the assembly is shown in a position of maximum tilt to one side, with one-half rotation of the respective cams resulting in maximum tilt to the other side. In each instance, as indicated, the periods of dwell may be provided for by corresponding flattened portions, whichever type of cam is utilized. In this respect, it should also be noted that the triple cam surface of the cam 90 will probably, in most cases, call for lesser r.p.m. of stub shaft 42, easily obtainable if a variable speed motor be used in the combination.

Although not shown, it is also to be understood, with reference to the cam arrangements shown in FIGURES 7 to 10, inclusive, that a spring element or other cushioning device may be inserted intermediate the ends of push rods 88. This may be desirable as a means of smoothing out the oscillatory motion, particularly at high rates of speed, as it is impulsed by the cam action, and also desirable in view of the fact that the interconnection between cams such as cams 85 and 90 and the chute 5 is more or less positive, and as here shown, less flexible than the spring arrangement of the embodiment of the invention shown in FIGURE 3.

Furthermore, instead of utilizing opposed cams on each side of the chute, a single cam on only one side thereof may be used. In such an instance, where the cam of FIGURE 3 is employed, the same may be counterbalanced by tension mechanism, as shown at 66 (FIGURE 3), on the other side to assure positive rocker motion.

From the foregoing, the operation and function of this novel arrangement of feed and distribution mechanism should be readily understood. By its use a relatively narrow charge of comminuted or other discrete material is transformed into a smooth and even, wider flow of material. In this particular instance, the oscillation of the chute enables rapid discharge to a drying conveyor belt in an even and constant manner, meaning that such charge is distributed at an even depth throughout the width of the conveyor means. This assures complete and efficient drying of the materials. Further, the manner of discharge is such that injury to the material being treated, as for example, preformed pellets, is prevented in the sense that the original and predetermined shape of same is retained in contrast to handling mechanisms known to the art.

There are many other obvious alternates and modifications which may be incorporated in the inventive combination without departing from the spirit and scope thereof; the scope of the invention is therefore not to be considered limited in any respects other than those set forth in the claims appended hereto.

I claim as my invention:

1. In a rocker feeder assembly, an inclined chute adapted to receive material at the inby end thereof, said chute being pivoted for movement about the longitudinal axis thereof, said chute being wider at its discharge end than at its inby end, means to oscillate said chute about said axis in predetermined amounts, said means comprising a pair of opposed drive wheels, each of said drive wheels having eccentric means thereon, one of said drive wheels being interconnected with one side of said chute, the other of said drive wheels being interconnected with the opposite side of said chute, said respective eccentric means being 180° out of phase with each other, each of said eccentric means having means to provide a predetermined period of dwell during oscillation of said chute, means to receive said material from said discharge end of said chute, and means to drive said drive wheels, whereby said chute is oscillated laterally to evenly spread out said materials on said receiving means.

2. The invention as defined in claim 1 wherein said chute is disposed angularly downwardly with respect to the horizontal from said inby end to said discharge end and said receiving means comprises a moving conveyor dryer belt inclined in an opposite direction.

3. The invention as defined in claim 2 wherein said downward angle is about 40°, and wherein said conveyor belt is angled in said opposite direction in an amount of about 15°.

4. In a rocker feeder assembly, an inclined chute having a pivotal mounting for oscillatory movement about the longitudinal axis thereof, said chute being substantially wider at its discharge end than at its inby end, said chute being arranged to receive discrete materials at the inby end thereof, means to oscillate said chute about said axis and in predetermined amounts of tilt to each side of said axis, said means comprising a pair of opposed cam wheels, each of said cam wheels having cam surfaces thereon representing high and low degrees of said tilt, said cam surfaces having opposed dwell portions comprised of flattened areas whereby the speed of oscillation at the respective positions of maximum tilt is substantially diminished, a drive shaft, each of said cam wheels being mounted on said drive shaft with said cam surfaces 180° out of phase with each other, means responsive to rotary motion of said cam wheels to tilt said chute first to one side and then the other, said last named means comprising push rods on each side of said chute connected thereto, the opposite ends of said rods having cam rollers thereon adapted to ride upon said cam surfaces, means to maintain said rollers in engagement with said cam surfaces, means to drive said drive shaft, means to receive said discrete materials from the discharge end of said chute, whereby upon rotary motion of said cam wheels, said chute is caused to oscillate from side to side and said materials are thereby evenly spread out and discharged to said receiving means.

5. The invention as defined in claim 4 wherein said cam surfaces are curved and formed in the facing sides of said cam wheels.

6. The invention as defined in claim 4 wherein said cam surfaces are curved, and formed on the periphery of said cam wheel.

7. In a rocker feeder assembly, an inclined chute having a pivotal mounting for oscillatory movement about the longitudinal axis thereof, said chute being arranged to receive discrete materials, said chute being substantially wider at its discharge end than at its inby end, means to oscillate said chute about said axis to cause predetermined amounts of tilt to each side of said axis comprising at least one cam wheel, said cam wheel having a cam surface thereon representing high and low degrees of said tilt, said cam surface being provided with opposed dwell portions comprised of flattened areas whereby the speed of oscillation at positions of maximum tilt is substantially diminished, means to rotate said cam wheel, means responsive to rotary motion of said cam wheel to tilt said chute first to one side and then the other, said last named means comprising a push rod connected to said chute at one end thereof, the opposite end of said rod having a cam roller adapted to ride upon said cam surface, means to maintain said roller in contact with said cam surface, means to receive said materials from said discharge end, whereby upon rotary motion of said cam wheel, said chute is caused to oscillate from side to side and said materials are thereby evenly spread out and discharged to said receiving means.

References Cited by the Examiner

UNITED STATES PATENTS

| | | | |
|---|---|---|---|
| 1,434,940 | 11/22 | Bertini | 131—108 |
| 1,543,315 | 6/25 | Bland | 198—52 X |
| 1,798,711 | 3/31 | States | 193—2 |
| 2,215,408 | 9/40 | Ruau | 131—109 |
| 2,727,614 | 12/55 | Bauer | 193—2 |
| 2,799,377 | 7/57 | Bridger et al. | 193—2 |
| 2,873,746 | 2/59 | Schlossmacher | 131—109 |
| 2,968,424 | 1/61 | Lawson | 193—2 X |
| 3,031,714 | 5/62 | Skrmetta et al. | 193—2 X |
| 3,057,454 | 10/62 | Frasch et al. | 198—45 |

SAMUEL F. COLEMAN, *Primary Examiner.*

WILLIAM B. LA BORDE, *Examiner.*